US007725507B1

(12) United States Patent
van Rietschote et al.

(10) Patent No.: US 7,725,507 B1
(45) Date of Patent: May 25, 2010

(54) DYNAMIC DIRECTORIES

(75) Inventors: Hans F. van Rietschote, Sunnyvale, CA (US); Slava Kritov, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 890 days.

(21) Appl. No.: 11/031,819

(22) Filed: Jan. 7, 2005

(51) Int. Cl.
*G06F 17/30* (2006.01)
(52) U.S. Cl. ..................................... 707/828
(58) Field of Classification Search .............. 707/8, 707/100, 101, 102
See application file for complete search history.

(56) References Cited

U.S. PATENT DOCUMENTS

| 5,758,153 | A | * | 5/1998 | Atsatt et al. | 707/103 R |
| 5,826,265 | A | * | 10/1998 | Van Huben et al. | 707/8 |
| 7,392,249 | B1 | * | 6/2008 | Harris et al. | 707/5 |
| 2001/0051955 | A1 | * | 12/2001 | Wong | 707/201 |
| 2006/0117063 | A1 | * | 6/2006 | Havewala et al. | 707/104.1 |

OTHER PUBLICATIONS

Blinkx Links; http://www.blinkx.com/overview.php ; Accessed and printed on Sep. 2, 2005.

"Blinkx Unveils Smarter Desktop Search"; Perez, Juan Carlos, IDG News Service; PC World; Nov. 15, 2004; http://www.pcworld.com/resource/printable/article/0.aid,118591,00.asp .

"Inside Win2K NTFS, Part 1"; Russinovich, Mark; InstantDoc #15719; WindowsITPro; Nov. 2000; http://www.windowsitpro.com/Articles/Print.cfm?ArticleID=15719 .

"Blackball RMFS (Rich Media File System Whitepaper)"; Bob Brown, CEO; Oct. 18, 2004; Copyright 2004, Blackball; http://www.blackball.us .

* cited by examiner

*Primary Examiner*—Don Wong
*Assistant Examiner*—Belinda Xue
(74) *Attorney, Agent, or Firm*—Rory D. Rankin; Meyertons Hood Kivlin Kowert & Goetzel, P.C.

(57) ABSTRACT

A system and method for creating and utilizing dynamic directories in a computing system. A computing system includes a file system and a dynamic directory mechanism. The dynamic directory mechanism is configured to enable a user to create dynamic directories which are identifiable as having special behaviors associated with them. The user may create executable instructions for performing the special behaviors in a user space of an operating system and associate the special behaviors with selected native file system operations which may be performed on the directory. In response to detecting an operation on a directory is initiated, the mechanism determines whether the directory is a dynamic directory. If the directory is a dynamic directory, the mechanism determines whether any predetermined special behaviors have been defined for the initiated operation and if so performs the special behaviors.

12 Claims, 6 Drawing Sheets

DYNAMIC DIRECTORIES

BACKGROUND OF THE INVENTION

1. Field of the Invention

This invention is related to the field of computing system file systems.

2. Description of the Related Art

When working with computing systems, it is common practice to use folders or directories to group together logically related files. For example, related emails may be grouped together in particular directories, or all .doc, .ppt, .pdf and .xls files belonging to a particular project may be stored in one directory. However, while such an approach may serve to facilitate organization, there are problems with this approach.

For example, if a particular file belongs to more than one project then you must either place a copy of the file in more than one directory, or use some type of link (e.g., a Unix® operating system type soft link) to make the file appear in both directories. In some cases, soft links may be preferable to copying given that changes made in one copy are generally not visible in other copies. Subsequent to the creation of the directories, a user may forget what the original criteria were for putting a given file in one directory versus another. Consequently, the effectiveness of using a directory to group related files becomes less and less useful over time.

Those familiar with the use of directories will appreciate that trying to determine what file goes into what directory may become fairly difficult. In addition, if you change your mind about the criteria on putting files in a directory, for example if the criteria becomes more or less stringent, then it may be necessary to manually reexamine every file on the file system to see if it matches the new criteria.

In addition to the above, the manner in which files in a directory can be viewed may be limited. For example, it may be relatively difficult to simply display all files which have been accessed in the last week or to show the last 10 created files. While some applications like Microsoft® Word have their own lists of previously accessed files, it is generally not possible to have a list of previously accessed files across all applications.

Accordingly, a flexible and effective method and mechanism for maintaining directories is desired.

SUMMARY OF THE INVENTION

A method and mechanism for dynamic content directories is contemplated.

In one embodiment, a computing system is contemplated which includes a file system and mechanism which supports the creation and utilization of dynamic directories. Utilizing the mechanism, a user may initiate the creation of a directory, or folder, and indicate that the directory is a dynamic directory which is to behave in a manner different than that of an ordinary directory. The user may define one or more special behaviors for the created dynamic directory and then associate special behaviors with operations which may be performed on the created dynamic directory. Subsequently, in response to detecting an operation on a particular directory in the file system, the mechanism determine whether the particular directory is a dynamic directory. If the directory is a dynamic directory, the mechanism determines whether any special behaviors have been defined which correspond to the operation. If special behaviors have been defined, the special behaviors are performed. Special behaviors may precede, follow, and/or replace the initiated operation.

In one embodiment, the user creates the special behaviors with executable instructions in a user space of an operating system. In addition, the special behaviors may be associated with operations which are native to the file system. In one embodiment, the file system is modified to include extended attributes which are utilized to indicate whether a directory is or is not a dynamic directory. Also contemplated is a system wherein the special behaviors which are defined by a user in a user space may be cached or otherwise stored by the file system in a non-user space of the operating system.

In one embodiment, special behaviors may be defined which serve to dynamically populate a dynamic directory with files meeting a particular criteria in response to a particular operation. In such an embodiment, the content of a directory may not be defined until the particular operation is performed. In addition, the content of the directory may change each time the operation is performed. Also contemplated is a dynamic directory mechanism which includes an integrated interface for defining special behaviors, creating code for special behaviors, and associating special behaviors with particular directories and/or operations.

These and other embodiments and aspects of the invention will become apparent upon reference to the following description and drawings.

Figure 1:
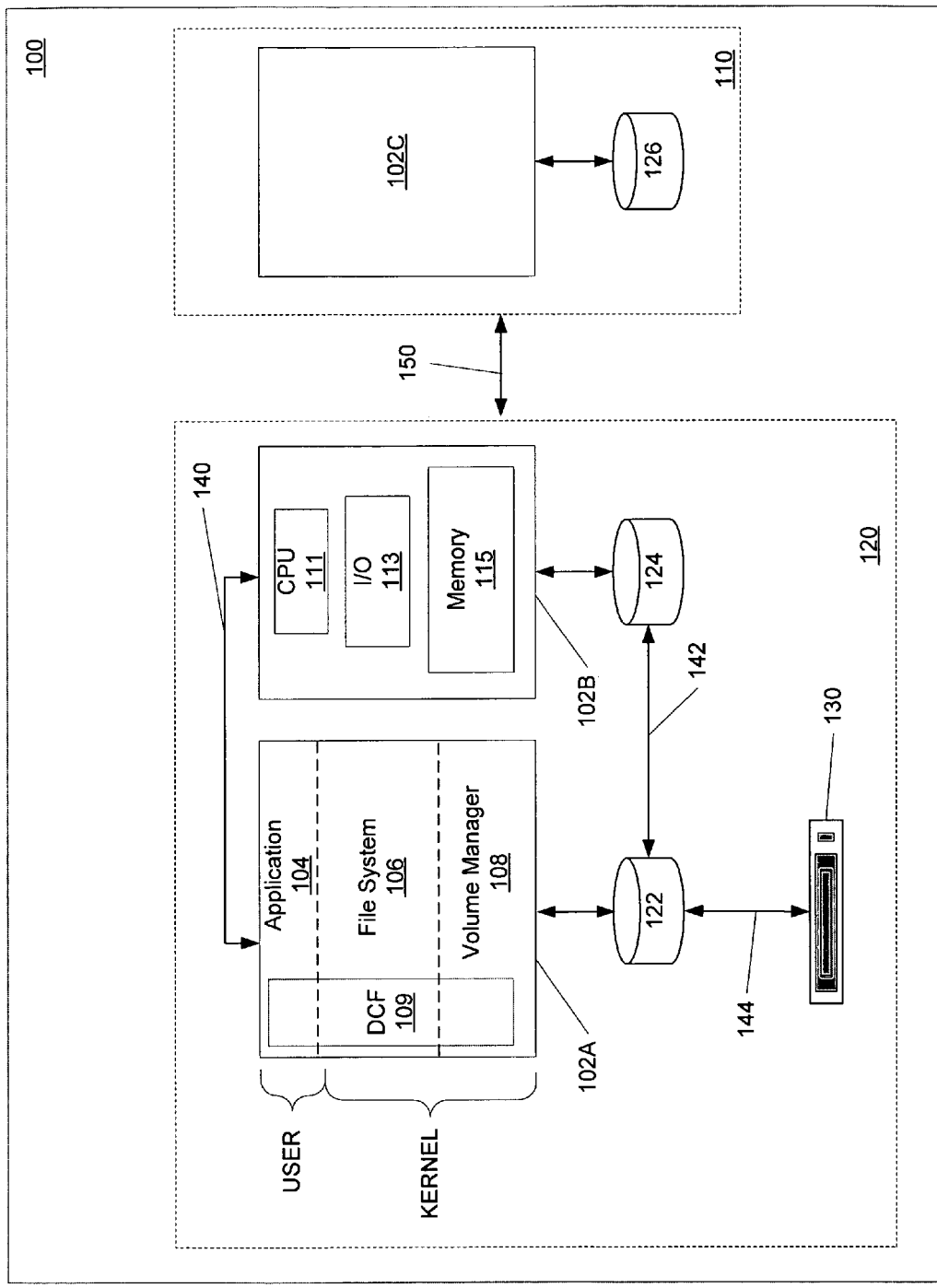
FIG. 1 is a diagram of a computing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 depicts one embodiment of a computing system 100. In the example shown, the computing system 100 includes three computing nodes 102A-102C.

Generally speaking, computing system 100 may include any number of nodes. The multi-node system 100 depicted in FIG. 1 is for purposes of discussion only. Each of nodes 102A and 102B illustrate hardware, software, and/or resources which may be present within any of nodes 102. Elements referred to herein with a particular reference number followed by a letter will be collectively referred to by the reference number alone. For example, nodes 102A-102C may be collectively referred to as nodes 102. Node 102A illustrates one embodiment of an operating system architecture and various software components with which each of the nodes 102 may be configured. Generally speaking, the operating system includes a user space configured for use by user level applications 104, and a kernel which may include file system components 106 and a volume manager 108. Node 102A is also shown to be coupled to one or more volumes 122 for data storage. Node 102B illustrates various resources and/or hardware components and systems with which each of the nodes 102 may be configured. For example, each node 102 may include one or more processors (CPU) 111, I/O subsystem 113, and memory 115. While FIG. 1 depicts a particular configuration for computing system 100 and nodes 102, it is to be understood that numerous alternative configurations are possible and are contemplated. For example, in other embodiments, computing system 100 may include only a single node.

In one embodiment, node 102A is coupled to a backup device 130 (such as tape backup) for backup and protection of data stored within volumes 122. In addition, to further improve system reliability, node 102B may be coupled to node 102A and configured to serve as a failover node in the event node 102A fails. In one embodiment, one or more of nodes 102 may also include support for Dynamic Content Folders (DCF) 109 which will be described further below. In one embodiment, DCF 109 support comprises code within either or both of user space or kernel.

In one embodiment, nodes 102A and 102B may be configured to operate as a cluster 120. In such an embodiment, nodes 102A and 102B may be active in servicing network users. Further, volumes 122 and 124 may comprise shared storage for use by the cluster 120. In an embodiment where nodes 102A and 102B are configured as a cluster, node 102C may be configured as a failover node 110 for cluster 120. For example, cluster 120 may represent a local node and node 102C may represent a remote node 110 in a system maintained as a global cluster 100. Remote node 110 may itself comprise a cluster of nodes or other network configuration. Numerous alternate configurations are possible.

Generally speaking, volume manager 108, file system 106, and/or DCF 109 components may be provided to various enterprises for use in their respective computing systems. In addition, the applications 104 which an enterprise uses may be provided by another party. Therefore, a given DCF component 109 may be designed to work with a variety of file systems, volume managers, and operating systems.

Figure 2:
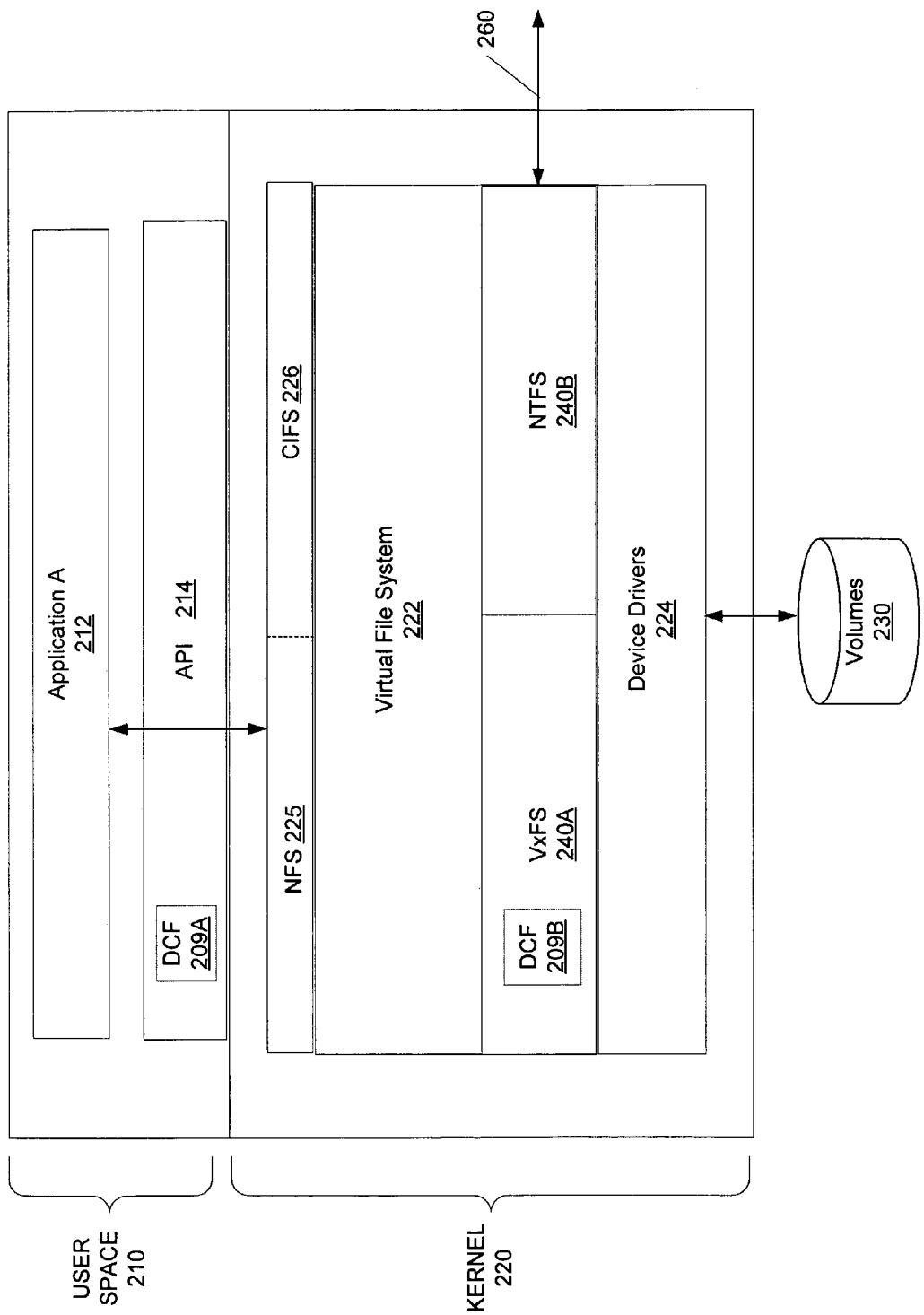
FIG. 2 depicts one embodiment of an operating system and storage device.

FIG. 2 illustrates one embodiment of the architecture of an operating system and storage. While numerous other architectures are possible and are contemplated, the example of FIG. 2 is provided for purposes of discussion. FIG. 2 illustrates that the architecture includes both a user space 210 and a kernel space 220. User space 210 includes application A 212. Application 212 is configured to initiate read and write transactions to volumes 230 via the virtual file system layer through system calls in the Application Programming Interface (API) 214. In the embodiment shown, kernel 220 includes multiple local file systems 240 such as VxFS 240A and NTFS 240B. A virtual file system 222 is also included which is configured to enable the use of multiple file systems 240 within a single operating system. In order to provide remote file access, file systems NFS 225 and CIFS 226 are included. Finally, kernel 220 includes device drivers 224 which are utilized in accessing volumes 230. It is to be understood that the example depicted in FIG. 2 is intended to be exemplary only. Numerous alternative configurations and embodiments are possible and are contemplated.

Also included in kernel 220 is a DCF component 209B configured to support the creation and use of dynamic content folders or directories. In the example shown, a related DCF component 209A is included as part of the API 214 as well. Generally speaking, the DCF supporting components 209 enable the creation of directories in a manner which is different than that of ordinary directories. For example, rather than creating a directory and explicitly populating the directory with particular files, a special type of directory may be created which may be dynamically populated with files based upon criteria indicated by a user. In one embodiment, an extended attribute of a created directory serves to distinguish ordinary directories from dynamic content directories. For purposes of discussion, the terms directory and folder may be used interchangeably herein. However, the use of either of the terms is not intended to be restricted to any particular file system or mechanism for organizing data. Those skilled in the art will appreciate that the methods and mechanisms described herein may be applied to a wide variety of folders, directories, sets, files, or other collections of data or data units.

Depending upon the type of file system utilized, various means may exist for creating directories and files with particular attributes. For purposes of discussion, a POSIX-like operating system and file system will be utilized. However, it is to be understood that the methods and mechanisms described herein may be utilized with other types of operating system and file systems.

In one embodiment, a file system may be divided into directories which are organized in a hierarchical manner. Data is typically stored in a file which is in turn stored in directory of the file system. As may be appreciated, the file system may contain numerous files. In order to keep track of the files, directories may be utilized to group or otherwise organize the files in a meaningful way. In addition to containing files, directories may also contain or identify other directories. Generally speaking, when a directory is created, it is assigned a name and it is given attributes. In a command line interface, a directory creation command (e.g., "mkdir") may be issued which includes a name for the new directory. In addition, command line parameters may be included which set particular attributes for the directory. In some cases, default attributes may apply where no corresponding parameter is indicated for a particular attribute.

For example, in one embodiment, a command for creating a new directory may have a syntax similar to the following:

mkdir [-m mode] dirname where the "-m" parameter indicates an indication of particular attributes follows, and "mode" identifies particular attributes. Those skilled in the art will appreciate there are a number of attributes which may set. Examples of such attributes include:

r reading permission
w writing permission
x execution permission
s user or group set-ID is turned on In one embodiment, a file system may include extended attributes for use in specifying whether a directory is a special type of directory with special behavior. For example, in one embodiment a "dynamic" directory may be created using a particular parameter, or alternatively a special directory creation command. For example, in addition to attributes such those indicated above, another mode may be indicated as follows:

d dynamic directory

Alternatively, a new parameter may be included so that the above syntax is similar to the following:

mkdir [-m mode] [-d [location]] dirname

In the above example, the "-d" parameter indicates the directory is a dynamic directory. As discussed further below, dynamic directories may behave differently from non-dynamic directories in that operations performed on the directories may involve pre or post processing. In one embodiment, a user may specify a particular location (e.g., via the "location" parameter above) where the behaviors for the newly created dynamic directory may be found. Alternatively, a default location may be established. In one embodiment, behaviors for a dynamic directory generally comprise code written by a user. For example, user scripts may be created and stored in an indicated location. Subsequently, when a particular operation is performed on a directory (e.g., a command to list a contents of the directory), the predefined location may be searched for user code which corresponds to the particular operation. If such code is found, the code is then executed.

Subsequent to creating a directory, the newly created directory may be populated with files, directories, and/or other data. Often files or directories are copied to, or created within, the directory. Alternatively, "soft links" may be created within the directory. Generally speaking, a soft link is a kind of data or file which points to a file or directory (or another soft link). In this manner, a pointer to a file may be created within a directory, rather than the file itself Files and links themselves may also have attributes similar to that discussed above.

In one embodiment, dynamic content directories (or "folders") may be created which are configured to be populated dynamically in response to a user operation. In such an embodiment, the content of a particular directory or folder is determined at the time a particular operation is performed on the directory. For example, in response to issuing a command to list a contents of a directory, the directory may be populated "dynamically" based upon some predetermined criteria. As an example, in response to a command to open a directory for access, or list a contents of a dynamic content directory, a list of files which are stored elsewhere could be searched to determine whether the conform to a particular criteria (e.g., files which include a particular string of text). If a file matches the criteria, the file is then soft linked into the dynamic content directory. Then when the directory contents are accessed or listed, it will contain all files matching the criteria.

From the above it can be seen that using dynamic content directories/folders (DCF) may allow a user to create criteria for a particular directory, and then every time the directory is listed its content is created automatically by a script (or other code) applying the criteria. In addition, the criteria may be changed at any time and immediately after this change the directory is re-created using the newest criteria. Further, soft linking may be used so that if a file is updated from inside the directory, the original is updated as well. Also, there is no need to remember a criteria which was originally established for a particular directory—the DCF will apply the criteria each and every time. The criteria could also be time based to include all files created in the last week or the last X number of created files.

In addition to the examples above, a behavior may be specified for a directory such that whenever a file is added to the particular directory, it is immediately copied to a remote location, a copy is emailed to a pre-defined address (which could be encoded in the directory name), or the file is automatically printed on a predefined device. In another example, a script (behavior) associated with a special directory may retrieve the fully qualified pathname and the directory and file being accessed and use these parameters to adapt its "behavior". For example, the script could search for a string equal to the directory name. Therefore, if the directory is named FOOBAR it will look for files containing the text string FOOBAR. If then the directory is renamed to BARFOO, then the script will look for files containing the string BARFOO.

Still further, in another example, whenever a file is created in a special directory of the file system, a script may parse the file and if it is an MP3 file then automatically delete the file. This means that the file system will not be able to contain MP3 files. (e.g., a policy created by the file system owner). Another use is to scan newly created files for viruses and take the correct action for an infected file. In yet another example, a directory may be created which dynamically contains the last 20 files accessed in a particular file system space. This may be done efficiently by a script that is run every time a file is read or written to a special directory by running pre-read/write scripts which keep soft links to the files accessed in the directory. Whenever a new file is soft linked into the directory and the directory already contains 20 files, the oldest created soft link is removed. In such a case, the special behaviors may be associated with file write operations.

In yet another example, dynamic music or video folders or directories may be created by a user. In the case of a dynamic music folder, accesses to the directory may initiate a search for music files and link all which are found in the dynamic directory. A dynamic video directory may operate similarly. Additionally, dynamic music or video folders may be created such that only music files for a particular artist, genre, or album are included. Numerous such alternatives are possible and are contemplated.

Figure 3:
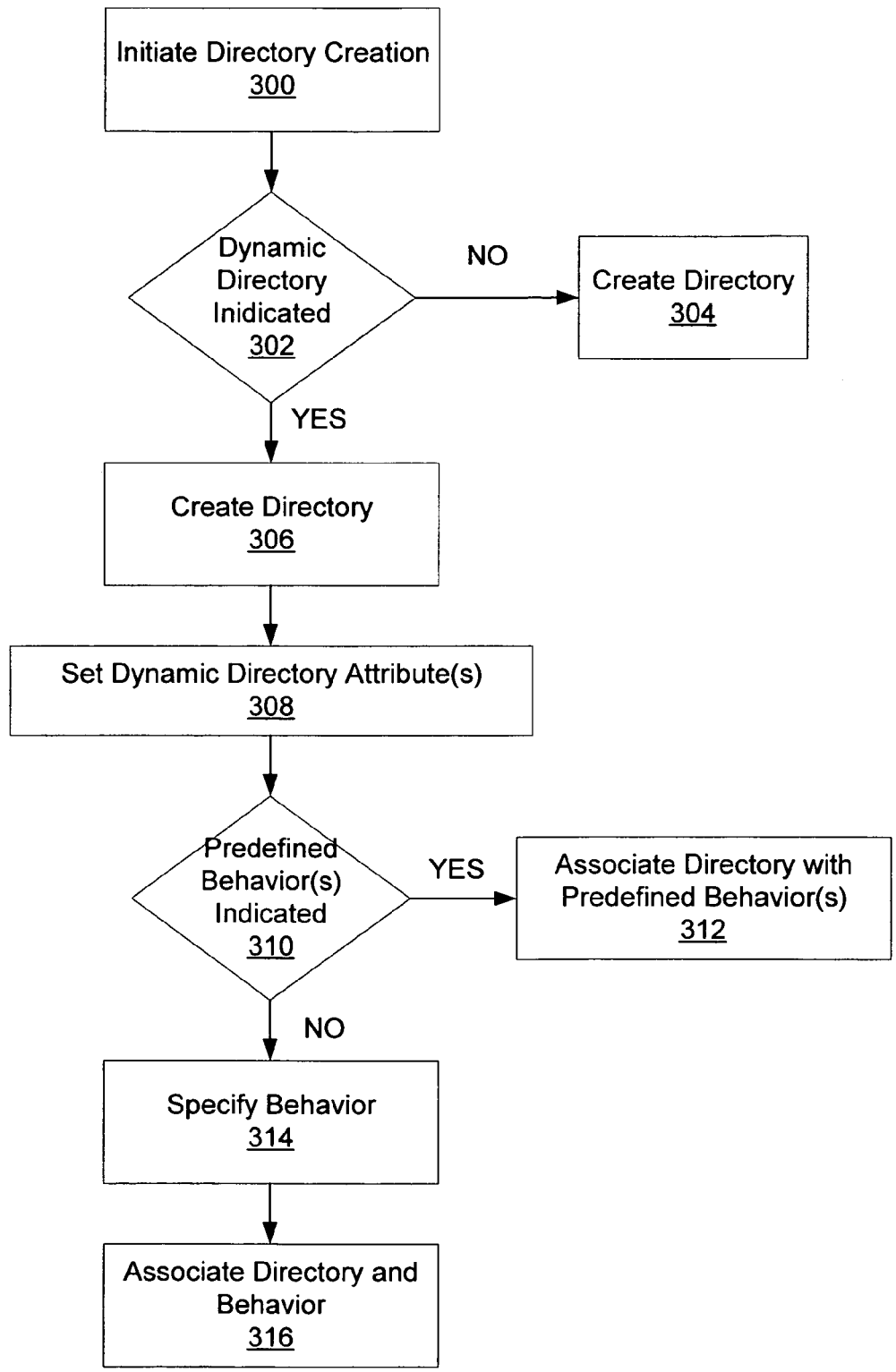
FIG. 3 illustrates one embodiment of a method for creating a dynamic directory.

FIG. 3 illustrates one embodiment of a method for creating a dynamic directory.

In the example shown, a command is issued to create a directory (block 300). If in decision block 302 a dynamic directory is indicated (e.g., by the command itself, or parameters accompanying the command), the flow proceeds to block 306. However, if a non-dynamic directory is indicated (e.g., an ordinary directory), then the flow proceeds to block 304 and the directory is created. In the case of a dynamic directory, the directory is created (block 306) and attributes for the dynamic directory may be set (block 308). As discussed above, the attributes may include an indication that the corresponding directory is a dynamic directory.

In some embodiments, predefined behaviors may be available and may be indicated by a command line parameter or similar method. For example, a system administrator could predefine a number of behaviors and make them available to users. An example of such a predefined behavior may be a dynamic directory which only stores the last ten files added to the directory. In such a case, a particular command line parameter may be defined (e.g., "-pdbeh last10", where -pdbeh indicates a predefined behavior follows and last10 identifies the particular predefined behavior) which indicates the predefined behavior. If a predefined behavior is indicated (decision block 310), the directory may then be associated with the predefined behavior(s) (block 312). On the other hand, a particular embodiment may allow a user to create and specify non-predefined behaviors. In such an embodiment, a user may similarly use a command line parameter (e.g., "-udbeh last20", where -udbeh indicates a user defined behavior follows, and last20 identifies a user defined behavior) or other method to indicate that a user defined behavior(s) is to be associated with the directory. Alternatively, if a predefined behavior is indicated (decision block 310), the user may be prompted for information which identifies the particular behavior(s) (block 314). The directory may then be associated with the behavior(s).

In one embodiment, when a dynamic directory is indicated, a special file associated with the dynamic directory is created and stored. The special file may itself include special behavior code or instructions (e.g., in the form of a script or otherwise) for the directory, or may point to the location of special behavior code. For example, in one embodiment, the special file may be created and stored by the file system in a hidden directory of the corresponding directory. Any time an operation corresponding to the dynamic directory is initiated, the file system determines the directory is a dynamic directory and searches for the corresponding special file. Included in the special file may be a list of operations and corresponding behaviors for the directory. For example, the special file may include behavior code when a list operation is performed for a directory. In response to a list operation, the behavior code is then executed. Alternatively, the file system may be configured to cache special behavior code when a dynamic directory is created. The special file may be created by the file system to include an identifier which is used to locate the cached behavior code. Still further, the file system (or the user) may consolidate all behavior code for dynamic directories in a predetermined location. In such a case, the special file may identify the predetermined location or the file system may automatically search the predetermined location for the corresponding code. Numerous such alternatives are possible and are contemplated.

Figure 4:
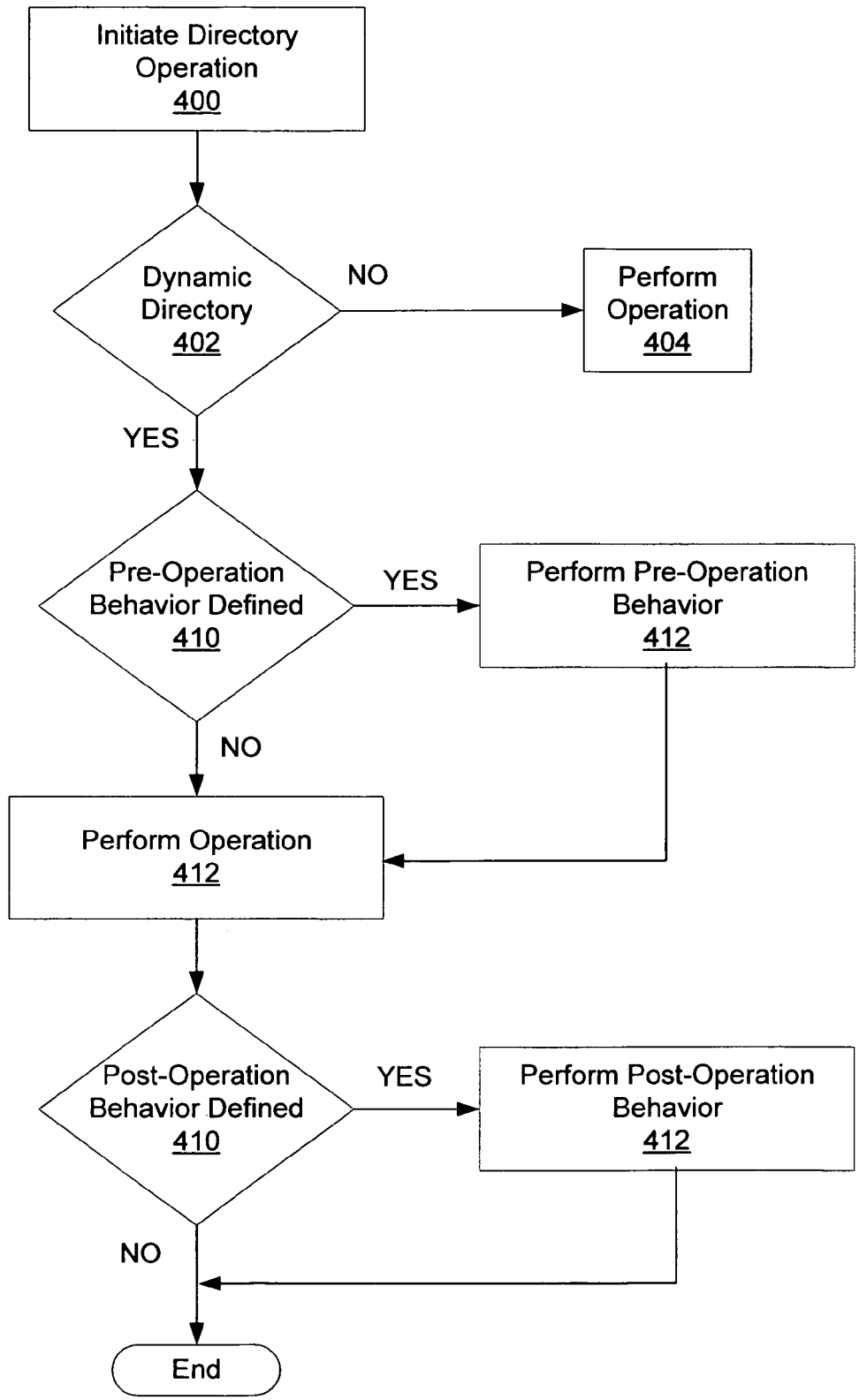
FIG. 4 illustrates one embodiment of a method for performing special behaviors associated with a directory.

Turning now to FIG. 4, one embodiment of a method for performing dynamic directory behaviors is illustrated. In the embodiment shown, an operation corresponding to a directory is initiated (block 400). For example, a command to list the contents of a directory may be issued by a user. In response to detecting the command, the file system may determine whether or not the directory whose contents are to be listed is a dynamic directory (decision block 402). In one embodiment, the file system may determine whether a directory is dynamic or not by reference to the corresponding directory attributes. If the directory is not a dynamic directory, then the requested operation may simply be performed (block 404).

On the other hand, if the directory is determined to be a dynamic directory (decision block 402), corresponding behavior code is accessed to determine whether there are any special behaviors defined for the requested operation. As discussed above, corresponding behavior code may be stored in a local (sub) directory, in a user defined alternate location, cached by the file system, or in any other suitable location. If special behaviors are defined for the operation, the special behaviors are performed. In the example shown, special behaviors are depicted has including behaviors which are performed both before and after the requested operation. However, any suitable behavior may be defined, including behaviors which simply replace the requested operation with an alternative operation. If a pre-operation behavior is defined (decision block 410), then the pre-operation behavior is performed prior to performing the requested operation (block 412). If no pre-operation behavior is defined, then the operation may simply be performed (block 412). In an example wherein a directory is opened/accessed for read or write purposes, a pre-operation behavior may comprise populating the directory with files (e.g., links to files) matching a particular criteria. Subsequently, a read or write access may be performed on the newly/dynamically populated directory. Subsequent to performing the requested operation (block 412), if a post-operation behavior is defined (decision block 410), such behaviors may be performed (block 412) and the operation completed. Otherwise, the operation may simply be completed.

Figure 5:
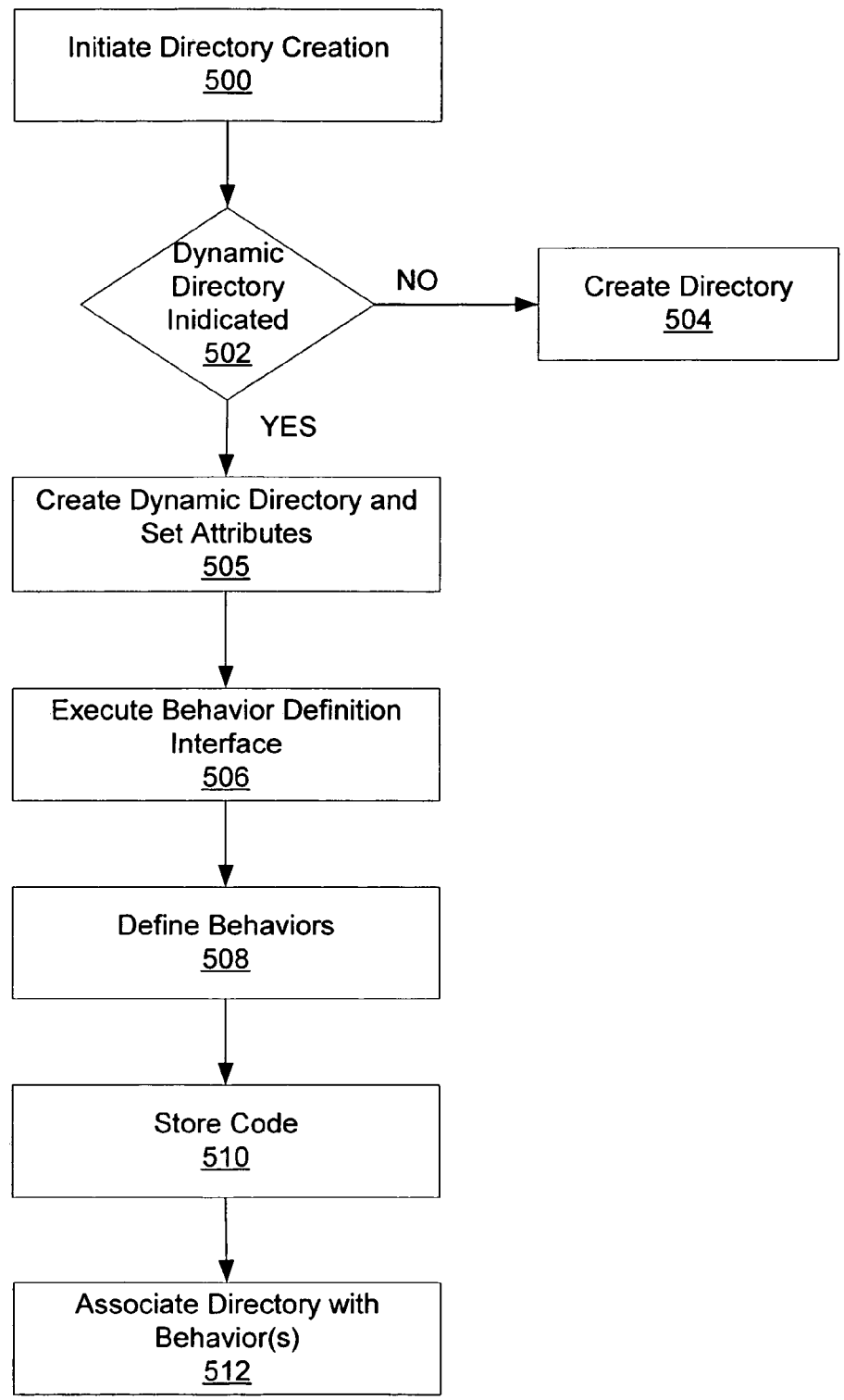
FIG. 5 illustrates one embodiment of a method for creating a dynamic directory.

In order to facilitate ease of use and behavior definition, the file system may be configured to provide a user interface for defining behaviors. FIG. 5 depicts one example of a method for facilitating the creation of special behaviors. Subsequent to initiating the creation of a directory (block 500), it is determined whether the directory is to be a dynamic directory (decision block 502). If a non-dynamic directory is being created, the directory may simply be created (block 504). If the creation of a dynamic directory is detected (decision block 502), the directory and corresponding attributes are created (block 505) and a graphical user interface may be displayed (block 506) which is configured to enable the definition and creation of special behaviors by a user. In one embodiment, the interface may display a selection of operations which may performed on the directory. A user may then select various operations and define behaviors for each of the selected operations (block 508). Instructions or code which define the behaviors may then be stored in the system (block 510). Finally, the defined behaviors are associated with the newly created directory (block 512) as discussed above.

Figure 6:
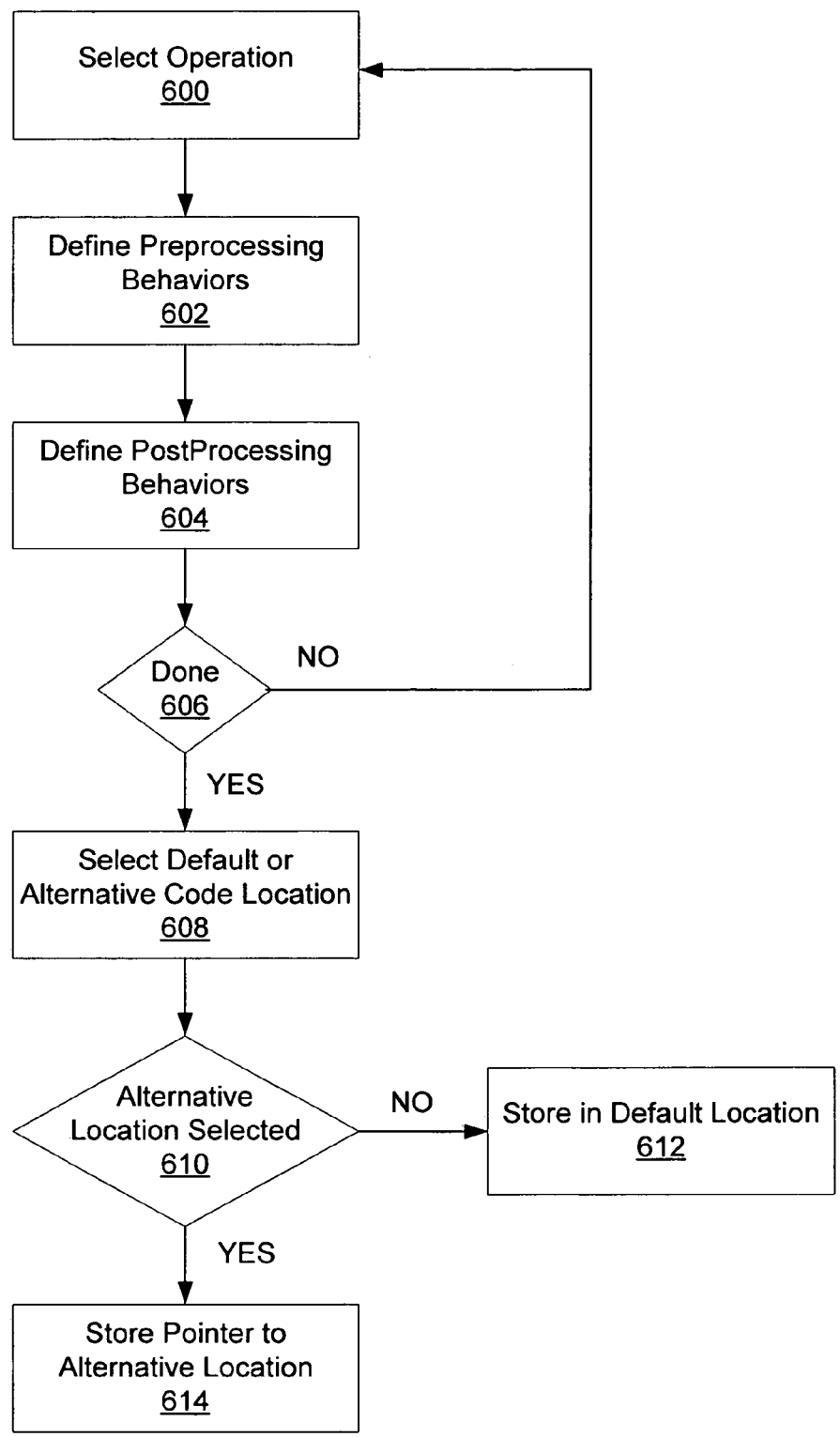
FIG. 6 illustrates one embodiment of a method for defining special behaviors for a dynamic directory.

The definition and creation of various behaviors as generally depicted by blocks 508 and 510 may be performed in a wide variety of ways. FIG. 6 depicts merely one of the ways in which the process may be performed. While viewing the displayed graphical user interface, a user may select a displayed operation (block 600) for which the user wishes to define particular special behaviors. The interface may then provide selections which indicate a user may define pre-processing behaviors (block 602), post-processing behaviors (block 604), or behaviors which are to completely replace the selected operation. Generally speaking, pre-processing and post-processing behaviors may correspond to behaviors which are performed before and after the selected operation, respectively. In response to the user indicating a desire to define a special behavior, the interface may include various alternatives as to how the viewer may proceed.

In one embodiment, the interface code may be configured to generate a skeleton for the special behavior code with stubs included where particular code for particular operations is to be inserted. In such a case, the user may edit the skeleton code after the directory is created by adding the behavior code. As an alternative, the interface may include an integrated behavior code development environment which allows a user to create (and perhaps test) the behavior code at the time the directory is being created. Such an environment can be as simple or as sophisticated as desired, and may be usable in a stand alone fashion as well. Still further, the interface may allow the user to simply identify the location of behavior code which the user has already created or otherwise provided. Any combination of the above approaches may be used. Numerous such alternatives are possible and are contemplated.

After the user has completed defining special behaviors for the directory (decision block 606), the user may specify a location that the behavior code is to be (or has been) stored (block 608). If a default location is selected (decision block 610), then the code is stored in a predetermined default location (block 612). Otherwise, an alternative location is identified (block 614). In an embodiment wherein the file system is configured to first look in a particular location for special behavior code (e.g., a local hidden directory), an alternative storage location may be identified by a pointer or address stored in the particular location.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, RDRAM, SRAM, etc.), ROM, etc. as well as transmission media or signals such as electrical, electromagnetic, or digital signals, conveyed via a communication medium such as network and/or a wireless link.

Numerous variations and modifications will become apparent to those skilled in the art once the above disclosure is fully appreciated. It is intended that the following claims be interpreted to embrace all such variations and modifications.

What is claimed is:

1. A computing system comprising:
   a file system; and
   a dynamic directory mechanism, wherein the dynamic directory mechanism is configured to enable a user to:
   create a given directory in the file system;
   specify an attribute particular to the given directory that indicates whether the particular directory is a dynamic directory or a non-dynamic directory;
   store said attribute in the file system;
   define one or more dynamic directory special behaviors, wherein the one or more special behaviors are defined by executable instructions created by a user in a user space of the operating system; and
   associate the one or more special behaviors with operations which may be performed on a created dynamic directory, wherein the operations correspond to directory operations which are native to the file system, and wherein the special behaviors comprise operations which are not native to the file system and which may be performed prior to, subsequent to, in lieu of, and/or in addition to an associated operation;
   wherein in response to detecting a first operation corresponding to a previously created particular directory is initiated, the dynamic directory mechanism is configured to:
   determine whether the particular directory is a dynamic directory based upon a corresponding attribute stored in the file system;
   in response to determining the particular directory is not a dynamic directory, perform the first operation without performing any special behaviors; and
   in response to determining the directory is a dynamic directory, determine whether predetermined special behaviors have been defined for the first operation; and
   perform the predetermined special behaviors in response to determining predetermined special behaviors have been defined for the first operation.

2. The computing system as recited in claim 1, wherein the one or more special behaviors are associated with a dynamic directory by (i) storing the executable instructions in a predefined location, or (ii) storing an identifier in a predefined location which identifies the location of the executable instructions.

3. The computing system as recited in claim 1, wherein the one or more special behaviors comprise dynamically populating the dynamic directory with files.

4. The computing system as recited in claim 3, wherein the files are represented in the dynamic directory by symbolic links.

5. The computing system as recited in claim 1, wherein in response to detecting a command to create a dynamic directory, the dynamic directory mechanism is further configured to:
   display a graphical user interface which provides selections for each of one or more operations which may performed on the dynamic directory; and
   automatically generate executable code corresponding to the special behavior, in response to a user selecting one or more of the provided selections.

6. The computing system as recited in claim 5, wherein the automatically generated code comprises skeleton code with stubs for each of the selections which are selected by a user.

7. A computer readable storage medium comprising program instructions which are operable to enable a user to:
   create a given directory in a file system;
   specify an attribute particular to the given directory that indicates whether the particular directory is a dynamic directory or a non-dynamic directory;
   store said attribute in the file system;
   define one or more dynamic directory special behaviors, wherein the one or more special behaviors are defined by executable instructions created by a user in a user space of an operating system; and
   associate the one or more special behaviors with operations which may be performed on a created dynamic directory, wherein the operations correspond to directory operations which are native to the file system, and wherein the special behaviors comprise operations which are not native to the file system and which may be performed prior to, subsequent to, in lieu of, and/or in addition to an associated operation;
   wherein in response to detecting a first operation corresponding to a previously created particular directory is initiated, the program instructions are operable to:
   determine whether the particular directory is a dynamic directory based upon a corresponding attribute stored in the file system;
   in response to determining the particular directory is not a dynamic directory, perform the first operation without performing any special behaviors; and
   in response to determining the directory is a dynamic directory:
   determine whether predetermined special behaviors have been defined for the first operation; and
   perform the predetermined special behaviors in response to determining predetermined special behaviors have been defined for the first operation.

8. The computer readable storage medium as recited in claim 7, wherein program instructions are operable to associate the one or more special behaviors with a dynamic directory by (i) storing the executable instructions in a predefined location, or (ii) storing an identifier in a predefined location which identifies the location of the executable instructions.

9. The computer readable storage medium as recited in claim 7, wherein the one or more special behaviors comprise dynamically populating the dynamic directory with files.

10. The computer readable storage medium as recited in claim 7, wherein the program instructions are comprise executable code within one or both of a file system and a user space of an operating system.

11. A method for use in a computing system, the method comprising:
   creating a given directory in a file system;
   specifying an attribute particular to the given directory that indicates whether the particular directory is a dynamic directory or a non-dynamic directory;
   store said attribute in the file system;
   defining one or more dynamic directory special behaviors, wherein the one or more special behaviors are defined by executable instructions created by a user in a user space of an operating system; and
   associating the one or more special behaviors with operations which may be performed on a created dynamic directory, wherein the operations correspond to directory operations which are native to the file system, and wherein the special behaviors comprise operations which are not native to the file system and which may be performed prior to, subsequent to, in lieu of, and/or in addition to an associated operation;

wherein in response to detecting a first operation corresponding to a previously created particular directory is initiated, the method further comprises:

determining whether the particular directory is a dynamic directory based upon a corresponding attribute stored in the file system;

in response to determining the particular directory is not a dynamic directory, performing the first operation without performing any special behaviors; and in response to determining the directory is a dynamic directory:

determining whether predetermined special behaviors have been defined for the first operation; and performing the predetermined special behaviors in response to determining predetermined special behaviors have been defined for the first operation.

12. The method as recited in claim 11, further comprising associating the one or more special behaviors with a dynamic directory by (i) storing the executable instructions in a predefined location, or (ii) storing an identifier in a predefined location which identifies the location of the executable instructions.

* * * * *